United States Patent [19]

Sternberg

[11] Patent Number: 4,641,356

[45] Date of Patent: Feb. 3, 1987

[54] APPARATUS AND METHOD FOR IMPLEMENTING DILATION AND EROSION TRANSFORMATIONS IN GRAYSCALE IMAGE PROCESSING

[75] Inventor: Stanley R. Sternberg, Ann Arbor, Mich.

[73] Assignee: Machine Vision International Corporation, Ann Arbor, Mich.

[21] Appl. No.: 644,101

[22] Filed: Aug. 24, 1984

[51] Int. Cl.⁴ .............................................. G06K 9/00
[52] U.S. Cl. ................................................... 382/49
[58] Field of Search ................... 382/49, 41, 6, 54, 56; 358/284

[56] References Cited

U.S. PATENT DOCUMENTS

| | | | |
|---|---|---|---|
| 3,106,699 | 10/1963 | Kamentsky | 382/49 |
| 3,214,574 | 10/1965 | Landsman et al. | 232/49 |
| 3,339,179 | 8/1967 | Shelton, Jr. et al. | 382/49 |
| 3,573,789 | 4/1971 | Sharp et al. | 382/54 |
| 3,805,035 | 4/1974 | Serra | 382/49 |
| 3,846,754 | 11/1974 | Oka et al. | 382/49 |
| 3,899,771 | 8/1975 | Saraga et al. | 382/21 |
| 4,167,728 | 9/1979 | Sternberg | 382/49 |
| 4,174,514 | 11/1979 | Sternberg | 382/49 |
| 4,290,049 | 9/1981 | Sternberg et al. | 382/49 |
| 4,301,443 | 11/1981 | Sternberg et al. | 382/49 |
| 4,322,716 | 3/1982 | Sternberg | 382/49 |
| 4,369,430 | 1/1983 | Sternberg | 382/27 |
| 4,395,697 | 7/1983 | Lougheed et al. | 382/49 |
| 4,395,698 | 7/1983 | Sternberg | 382/27 |
| 4,395,699 | 7/1983 | Sternberg | 382/41 |
| 4,395,700 | 7/1983 | McCubbrey et al. | 382/27 |

OTHER PUBLICATIONS

"Industrial Computer Vision by Mathematical Morphology" by Stanley R. Sternberg Proceedings of the 13th International Symposium on Industrial Robots/Robots 7, Chicago, Illinois, Apr. 18–20, 1983.

"Biomedical Image Processing" by Stanley R. Sternberg; Copyright 1983 IEEE; published Jan. 1983 issue of Computer.

"Computer Architectures Specialized for Mathematical Morphology" by Stanley R. Sternberg, Dept. of Electrical and Computer Engineering, University of Michigan; Workshop on Algorithmically Specialized Computer Organizations, Purdue Univ., West Lafayette, IN, Sep. 29–Oct. 1, 1982.

"A Comparison of Computer Vision Methodologies" by Stanley R. Sternberg; Dec. 21, 1981.

"Computer Architectures for Pictorial Information Systems" by Per-Erik Danielsson and Stefano Levialdi; Copyright 1981 IEEE; published in Nov. 1981 issue of Computer.

Pages 836–840 of IEEE Transactions on Computers, vol. C-29, No. 9, Sep. 1980, "Design of a Massively Parallel Processor" by Kenneth E. Batcher; Copyright 1980 IEEE.

"A Systematically Designed Binary Array Processor" by Anthony P. Reeves, published in the IEEE Transactions on Computers, vol. C—29, No. 4, Apr. 1980, pp. 278–287.

"Design and Use of DIP-1: A Fast, Flexible and Dynamically Microprogrammable Pipelined Image Processor" by F. A. Gerritsen and L. G. Aardema, Delft University of Technology, Delft, The Netherlands, Jan. 1980, revised May 1980.

"Parallel Architectures for Image Processing" by Stanley R. Sternberg; Copyright 1979 IEEE Compsac.

List Continued on next page.

Primary Examiner—Stephen A. Kreitman
Attorney, Agent, or Firm—Price, Heneveld, Cooper, DeWitt & Litton

[57] ABSTRACT

The specification discloses a system and method for processing digital representations of grayscale images to produce grayscale image transformations at unparalleled speed and efficiency. The system includes circuitry for effecting transformations of an image by repetitively (1) delaying the serialized digital image, (2) adding a constant value to each word of the delayed serialized digital image, and (3) logically combining the delayed and undelayed serial images on a word-by-word basis.

30 Claims, 37 Drawing Figures

OTHER PUBLICATIONS

"Basics of Cellular Logic with Some Applications in Medical Image Processing" by Kendall Preston, Jr., Michael J. B. Duff, Stephano Levialdi, Philip E. Norgre and Jun-Ichiro Toriwaki; published in May 1979 Proceedings of the IEEE, vol. 67, No. 5, pp. 826-859.

"Cytocomputer Real-Time Pattern Recognition" by Stanley R. Sternberg; based on presentation to the Eighth Annual Automatic Imagery Pattern Recognition Symposium, National Bureau of Standards, Gaithersburg, Maryland, Apr. 3-4, 1979.

"Advanced Analysis of SLR Changes" Westinghouse Electric Corporation; Final Technical Report, Nov. 1974, Report sent to Rome Air Development Center, Air Force Systems Command, Griffiss Air Force Base, New York 13441.

"A Parallel Picture Processing Machine" by Bjorn Kruse, published in Dec. 1973 issue of IEEE Transactions on Computers, vol. C-22; No. 12, pp. 1075-1086.

"Interactive Image Processor Speeds Pattern Recognition by Computer" by Kendall Preston, Jr. and Philip E. Norgren, published in Oct. 23, 1972, issue of *Electronics*, pp. 89-98.

"The Texture Analyser" by J. C. Klein and J. Serra, published in the Apr. 1972 Journal of Microscopy, vol. 95, Pt 2, pp. 349-356.

"Feature Extraction by Golay Hexagonal Pattern Transforms" by Kendall Preston, Jr., published in the Sep. 1971 issue of IEEE Transactions on Computers, pp. 1007-1014, vol. C-20, No. 9.

"Local Properties of Binary Images in Two Dimensions" by Stephen B. Gray, published in the May 1971 issue of IEEE Transactions on Computers, vol. C-20, No. 5, pp. 551-561.

"Hexagonal Parallel Pattern Transformations" by Marcel J. E. Golay, published in the Aug. 1969 issue of IEEE Transactions on Computers, vol. C-18, No. 8, pp. 733-739.

"The Illinois Pattern Recognition Computer-ILLIAC III" by Bruce H. McCormick, published in the 1963 issue of IEEE Transactions on Electronic Computers, pp. 791-813.

"Blood-Cell Scanner Identifies Rare Cells" by Nicholas F. Izzo and William Coles, published in the Apr. 27, 1962 issue of *Electronics*, pp. 52-57.

"Pattern Detection and Recognition" by S. H. Unger, published in the Oct. 1959 issue of the Proceedings of the IRE, pp. 1737-1752.

"A Computer Oriented Toward Spatial Problems" by S. H. Unger, published in the Oct. 1958 issue of the Proceedings of the IRE, pp. 1744-1750.

"Cellular Computers and Biomedical Image Processing" by Stanley R. Sternberg, reprinted from lecture notes in Medical Informatics, vol. 17, Biomedical Images and Computers edited by J. Sklansky and J. C. Bisconte, Springer-Verlag Publishers, Berlin, Heidelberg, New York.

"The GOP, a Fast and Flexible Image Processor" by Goesta H. Granlund.

Lee & Fu, "The GLGS Image Representation and Its Application to Preliminary Segmentation and Pre-Attentive Visual Search", 7, 1981 IEEE.

Goetcherian, "From Binary to Grey Tone Image Processing Using Fuzzy Logic Concepts", 12, *Pattern Recognition*, p. 17 (1980).

Holden & Morrin, "A Feasible Computer System for Grey-Level, Pictorial Pattern Recognition", 7, *Pattern Recognition*, p. 147 (1975).

Lay, Baudoin and Klein, "Automatic Detection of Microaneurysms in Retinopathy Fluoro-Angiogram", (undated).

Rodenacker, Gais, Jutting and Burger, "Mathematical Morphology in Grey-Images" (undated).

Makhlin, "Grey Scale Robot Vision for Real-Time Inspection and Assembly", (undated).

APPARATUS AND METHOD FOR IMPLEMENTING DILATION AND EROSION TRANSFORMATIONS IN GRAYSCALE IMAGE PROCESSING

BACKGROUND OF THE INVENTION

The present invention relates to image processing systems and methods, and more particularly to digital systems and methods for processing grayscale images.

A wide variety of image processing systems have been developed enabling digital computers to "see" or "read" an image. Typically, these image processors include a video camera, an analog-to-digital converter for digitizing the video signal produced by the camera, and a digital device for processing the digitized information. For example, the image can be digitized into a matrix, or lattice, of pixels with each of 512 video scan lines divided into 512 pixels. In a nongrayscale image, each pixel can be encoded in a single bit which is set to zero if the pixel is dark and set to one if the pixel is illuminated. In a grayscale image, each pixel is encoded in a multi-bit word which is set to a value corresponding to the illumination intensity of the pixel. Grayscale images are of course more realistic and detailed than nongrayscale images. The image processors scan the digital images and process the digital information to interpret the image.

One extremely efficient nongrayscale image processor is disclosed in U.S. patent application Ser. No. 559,438, filed Dec. 8, 1983, by Sternberg et al, entitled APPARATUS AND METHOD FOR IMPLEMENTING TRANSFORMATIONS IN DIGITAL IMAGE PROCESSING (hereinafter "the Sternberg binary processor"). This processor includes digital circuitry for effecting dilations and other transformations of serialized bit-wide streams representative of nongrayscale images. More specifically, the processor includes a plurality of sequentially coupled function units, each including a delay unit for delaying the serialized stream and a logic unit for performing any one of a plurality of logical operations on the delayed and undelayed streams. However, the Sternberg processor is capable of processing only bit-wide, or binary, data streams.

Another image processor, less efficient than the Sternberg binary processor, routes a grayscale serial signal sequentially through several neighborhood transformations to detect limited image features. Disclosures of this processor are provided in U.S. Pat. No. 4,395,699, entitled METHOD AND APPARATUS FOR PATTERN RECOGNITION AND DETECTION, issued July 26, 1983, to Sternberg, and U.S. Pat. No. 4,322,716, entitled METHOD AND APPARATUS FOR PATTERN RECOGNITION AND DETECTION, issued Mar. 30, 1982, to Sternberg. At each neighborhood transformation stage, the "neighborhood" of pixels surrounding a given pixel in one image is examined and the corresponding pixel in the new image is given a value which is a function of the neighborhood pixels in the old image. All neighborhood pixels in an image are made available for processing by serially routing the digital image through one or more shift registers. As the image is shifted through the registers, the appropriate register locations are simultaneously accessed to process a particular neighborhood.

This neighborhood processor also has drawbacks. First, the entire neighborhood of a pixel must be made available and examined before the corresponding pixel in the new image can be given a value. This requires excessive delay and excessively complicated circuitry to make the neighborhood pixels simultaneously available to drive the neighborhood function generator. Second, the neighborhood processing theory is an inefficient and cumbersome method of effecting many image transformations. Third, the neighborhood theory greatly restricts the operations which can be performed, due to the limited size of the neighborhood. Although in theory the neighborhood could be enlarged, the hardware required to implement such a neighborhood enlargement would be even more expensive and/or complicated.

SUMMARY OF THE INVENTION

The aforementioned problems are solved by the present invention. Essentially, a grayscale image processor and method are provided for effecting dilations and erosions of grayscale images at improved speeds and efficiencies using simplified circuitry. More particularly, the image processor includes digital circuitry for performing a dilation of a grayscale digital image through a series of function units, each including a signal delay device, a signal supplementation device, and a signal recombination device. The function units are serially connected such that the output line of one unit is coupled to the input line of the subsequent unit. Each unit includes a delay device for delaying the input serial signal, an adder device for adding a fixed value to each word of the delayed signal, and a logic device for combining the undelayed input signal and the delayed supplemented signal to produce an output signal. By appropriately selecting the number of processing stages, the length of the delay at each stage, and the fixed value added to each word of the serial signal at each stage, the processor rapidly and efficiently performs grayscale image dilations and other image transformations using circuitry quite simplified over that known in the art.

The present system and method are based on mathematical morphology, the science of processing and analyzing digital images through set transformations. The dilation operation propogates pixel states representative of relatively high intensities throughout some region of a grayscale image. The dual operation, erosion, contracts regions of relatively high grayscale intensity in an image. The transformations of mathematical morphology have previously been implemented for grayscale images as neighborhood transformations. The present invention eliminates the need for neighborhood transformations of grayscale images as a source of dilation and erosion transformations and thus eliminates the relatively complex circuitry required to make a neighborhood of grayscale pixels accessible simultaneously. The processor is capable of dilating and eroding grayscale images at relatively rapid speeds using comparatively simple circuitry as compared with known processors. Thus, the present invention is both a simplification and an extension of the current methodology.

These and other objects, advantages, and features of the invention will be more readily understood and appreciated by reference to the drawings and the detailed description of the preferred embodiment.

DETAILED DESCRIPTION OF THE PREFERRED EMBODIMENT

Image Processor Hardware

Figure 1:
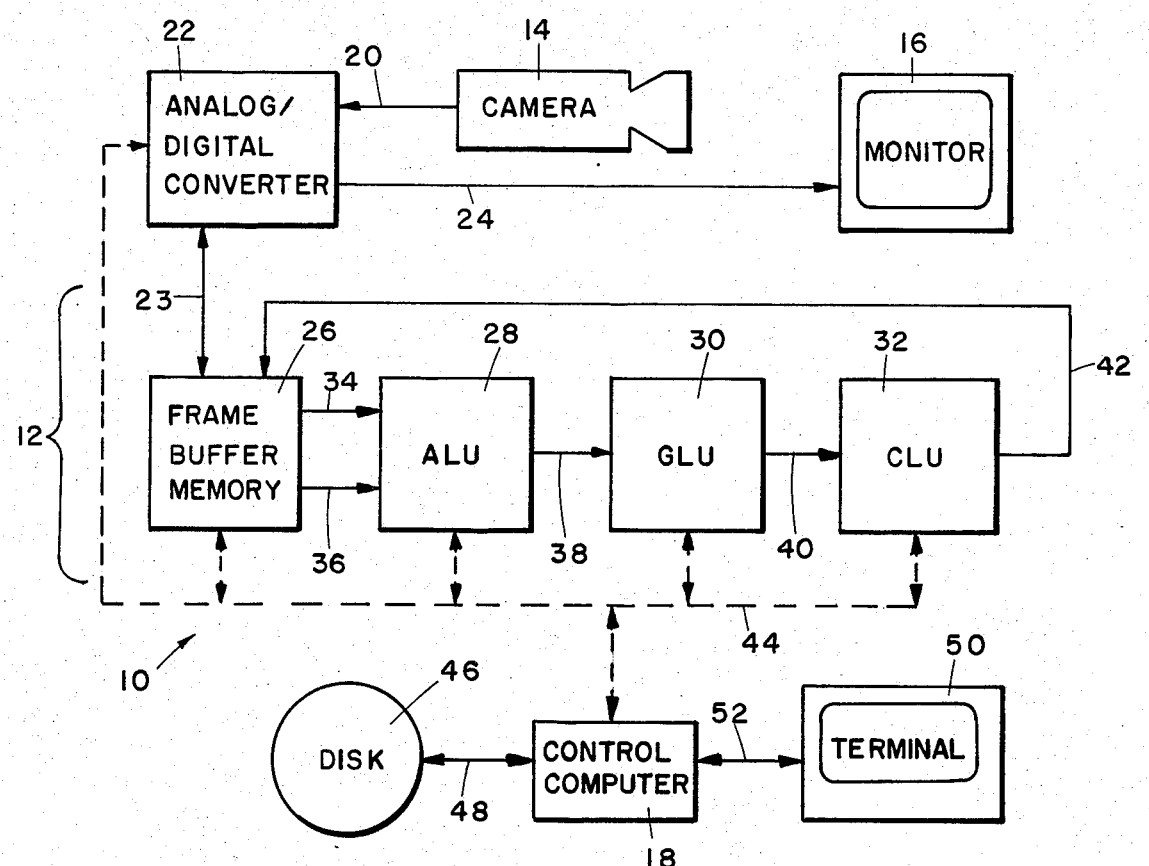
FIG. 1 is a schematic diagram showing the grayscale image processor of the present invention.

A grayscale image processor 10 constructed in accordance with a preferred embodiment of the invention is illustrated in FIG. 1, wherein data lines are illustrated as solid lines and control lines are indicated as broken lines. Processor 10 includes processing unit 12, camera 14, monitor 16, and control computer 18. Camera 14 provides real images to both processing unit 12 and monitor 16. Unit 12 is capable of manipulating the real images inputted by camera 14 to produce a variety of virtual images, or image transformations, useful in analyzing the real image. Monitor 16 selectively displays either the real image observed by camera 14 or a virtual image produced by processing unit 12. Computer 18 provides appropriate control signals to the various elements of unit 12 to manipulate or transform the grayscale images according to an algorithm to produce a desired virtual image usable for feature extraction or other imaging information.

Camera 14 (FIG. 1) provides a standard RS170 signal on output line 20. This analog composite video signal is transmitted over line 20 at a rate of 30 frames per second with 480 horizontal scan lines per frame. Analog/digital converter 22 converts the analog serial signal received on line 20 to a serial digital signal outputted on bus 23 to processing unit 12. Similarly, converter 22 can convert a digital signal received on bus 23 from unit 12 to an analog signal on line 24 to be displayed on monitor 16. Alternatively, the analog signal on line 20 from camera 14 can be passed directly to monitor 16 via line 24.

The digital signal on eight-line bus 23 includes one eight-bit word for each pixel in the video image. The analog signal is digitized into 512 pixels per line on each of the 480 scan lines. Therefore, the processed image is made up of a matrix of lattice points or pixels. The eight-bit word corresponding to a pixel is given a value between 0 and 255 inclusive depending upon the intensity of the analog signal (light intensity) of the pixel. The value 0 corresponds to total lack of intensity (i.e., darkness), while the value 255 corresponds to maximum intensity. The serialized digital representation passing over bus 23 is eight bits wide and includes one eight-bit word for each pixel in the grayscale image.

Processing unit 12 (FIG. 1) includes frame buffer memory 26, arithmetic logic unit (ALU) 28, geometric logic unit (GLU) 30, and count/locate unit (CLU) 32. All data buses interconnecting the elements of processing unit 12 are eight bits wide enabling the serial signal to be transmitted over any one of the data lines. A pair of buses 34 and 36 interconnect frame buffer memory 26 and ALU 28; bus 38 interconnects ALU 28 and GLU 30, bus 40 interconnects GLU 30 and CLU 32; and bus 42 interconnects CLU 32 and frame buffer memory 26. When one or two digital representations in frame buffer 26 are to be processed, the serial signal streams are outputted on buses 34 and 36 to ALU 28 which produces a single serial signal which then passes sequentially through GLU 30 and CLU 32 to return to frame buffer 26.

Frame buffer memory 26 (FIG. 1) is three 512 by 512 by 8 bit storage devices enabling three separate digital images to be stored simultaneously therein. In the preferred embodiment, frame buffer 26 is three Model FB512 storage devices, manufactured by Imaging Technologies of Wolburn, Mass.

Arithmetic logic unit (ALU) 28 (FIG. 1) is a point or pixel processor, meaning that operations are carried out on the input image or images on a pixel-by-pixel basis to create an output image. Buses 34 and 36 convey one or two digital images from memory 26 to ALU 28 for processing. The digital image created by ALU 28 is outputted on bus 38 to GLU 30. The arithmetic functions which ALU 28 is capable of performing include, for example, passing an image, adding two images, subtracting two images, multiplying two images, dividing two images, ANDing two images, ORing two images, or complementing an image. In the preferred embodimet, ALU 28 is a Model ALU512 logic unit manufactured by Imaging Technologies of Wolburn, Mass.

Geometric logic unit (GLU) 30 (FIG. 1) is coupled to ALU 28 by bus 38 and to count/locate unit 32 by bus 40. GLU 30 is more clearly illustrated in FIG. 2 to be discussed below. Suffice it to say at this point that bus 38 serially applies a digital image from ALU 28 to GLU 30 for processing. The digital image created by GLU 30 is outputted on bus 40 to CLU 32.

Count/locate unit (CLU) 32 (FIG. 1) is connected by buses 40 and 42 to GLU 30 and frame buffer 26, respectively. One of two functions can be performed by CLU 32 as the serial signal stream passes therethrough. CLU 32 does not affect the values of the serial signal stream in either function. First, CLU 32 can output on control bus 44 the coordinates of pixels within a given grayscale range. Second, CLU 32 can provide on bus 44 a frequency count or histogram of pixels within a given grayscale range. The output coordinates and the histogram information are utilized by computer 18 in further control of processing unit 12. The digital image exiting CLU 32 on bus 42 is identical to the image entering the CLU on bus 40.

Overall system control is provided by control computer 18 (FIG. 1) which is coupled to A/D converter 22, frame buffer 26, ALU 28, GLU 30, and CLU 32 through multibus 44. Conrol signals are issued by computer 18 over multibus 44 during each vertical retrace of camera 12 to condition processor 10 for a possible imaging operation during the next frame period of the camera. Whenever a digital image is processed, the serial signal is routed sequentially through ALU 28, GLU 30, and CLU 32 to return to frame buffer 26. Each loop through the elements of processing unit 12 can be performed once and only once during each frame period to produce one digital image to be stored in memory 26. Each frame or image contains approximately one-quarter million (250,000) pixels. ALU 28, GLU 30, and CLU 32 all operate at a speed of approximately ten megahertz to process one entire digital image during approximately one frame cycle and leave sufficient time for control computer 18 to reprogram the units for operation during the next frame cycle. In the preferred embodiment, computer 18 comprises a MOTOROLA 68000 microcomputer having 512K of memory.

Disc 46 (FIG. 1) is conventionally coupled through bus 48 to computer 18 to provide the requisite storage for the computer. Terminal 50 including a keyboard is conventionally coupled through bus 52 to computer 18 to provide a means of communicating command signals to the control computer.

Grayscale Image Processing

Figure 3:
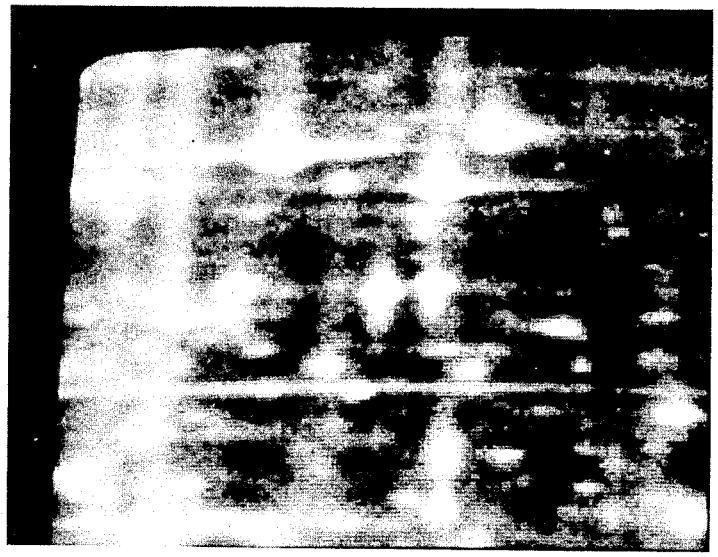
FIG. 3 is a grayscale real image of a laboratory specimen wherein human blood proteins are dispersed within an electrophoretic gel.

The utility of grayscale image processing is illustrated in FIGS. 3–7. FIG. 3 is a real image of a laboratory sample of human blood proteins distributed within a two-dimensional electrophoretic gel. The light intensity of each pixel throughout the image is proportional to the density of proteins at the pixel. Proteins disperse vertically according to their molecular weight and disperse horizontally according to their molecular charge. The means for producing such a laboratory sample is generally well known.

Specimens such as disclosed in FIG. 3 are analyzed to determine the position and amount of each protein within the sample. By locating the position of the proteins, one can determine the types of proteins present. By determining the intensity of the image at each location, one can determine the amount of proteins present. Image processing is desired which will reveal the intensity and location of the local protein spots.

Figure 4:
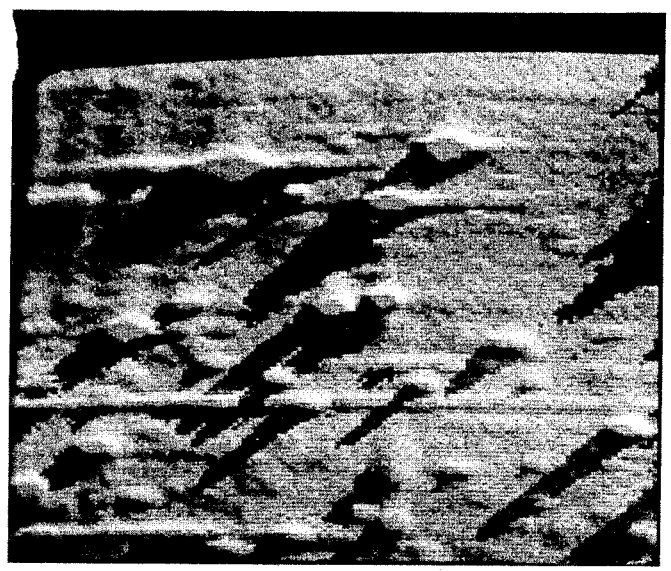
FIG. 4 is a grayscale virtual image conceptually illustrating the umbra of the real image of FIG. 3.

The FIG. 4 virtual image appears to be a three-dimensional surface wherein the apparent height of the surface at each pixel corresponds to the light intensity of the FIG. 3 real image at each pixel. The FIG. 4 surface appears to be illuminated by a light source located an infinite distance from the upper right corner of FIG. 4. The production of the FIG. 4 virtual image is generally well known to those having skill in the art of computer graphics and does not comprise the subject matter of the present application. FIG. 4 is provided herein simply as an alternative conceptualization of the grayscale image of FIG. 3.

Figure 37:
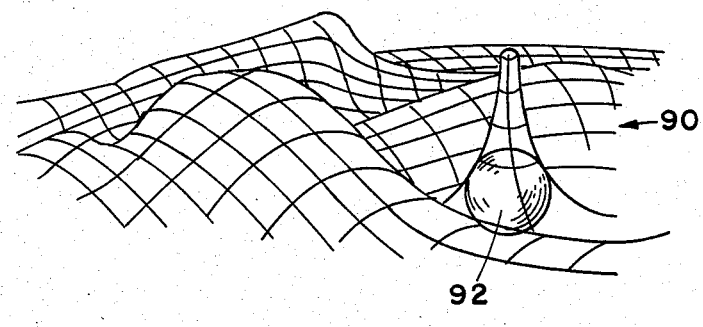
FIG. 37 conceptually shows the opening of a grayscale image by a spherical structuring element.

As is well known, the opening of an image by a structuring element is the result of two sequential operations—namely, erosion and dilation of the image by the same structuring element. These grayscale image transformations are generally well known to those having skill in the art. For example, FIG. 37 illustrates the opening of a grayscale image 90 by a spherical structuring element 92. The height of image surface 90 corresponds to the light intensity. The opening of the image by element 92 is the locus of points covered by the spherical element wherever the element is tangential to and below the image surface.

Figure 5:
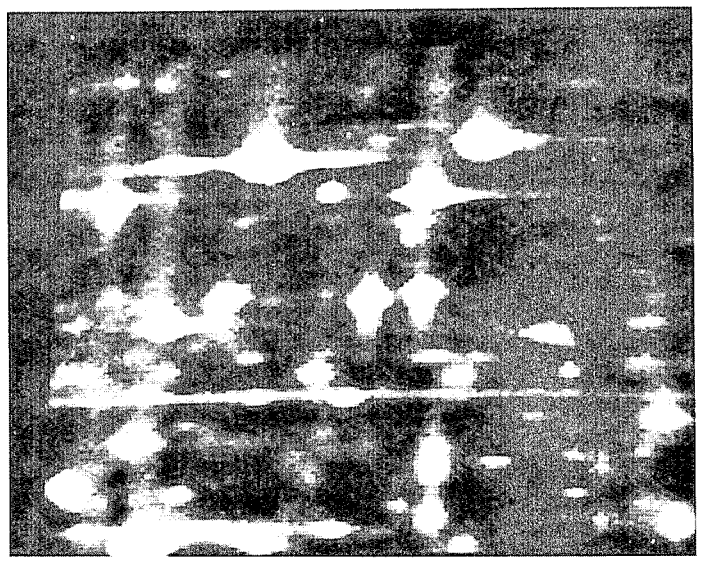
FIG. 5 is a virtual image showing the opening of the real image of FIG. 3 by a spherical structuring element subtracted from the real image of FIG. 3.

FIG. 5 is a virtual image which is the result of subtracting the opening of the FIG. 3 real image from the FIG. 3 real image. The opening of the FIG. 3 real image is by a spherical structuring element having a diameter larger than the largest protein spot. The opening of the FIG. 3 image by the spherical structuring element removes the spots and the streaks in the FIG. 3 image because the spherical structuring element is "too large" to fit in the spots or streaks. Subtracting the opening from the original image removes the nonhomogeneous background of the image (i.e., variation in background intensity) due to uneven lighting of the real image and/or smearing of the protein in the electrophoresis process.

Figure 6:
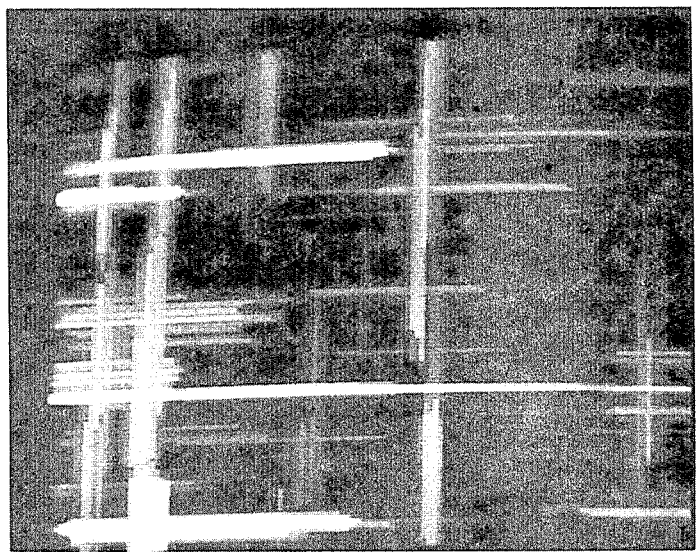
FIG. 6 is a virtual image showing the union of the openings of the real image of FIG. 3 by structuring elements comprising vertical and horizontal bars.

FIG. 6 is a grayscale virtual image which comprises the union of two openings—the first using a vertical bar structuring element longer than the widest spot and the second using a horizontal bar structuring element longer than the widest spot. The FIG. 6 image illusrates the streaks in the electrophoretic specimen which should be removed prior to locating the protein deposits.

Figure 7:
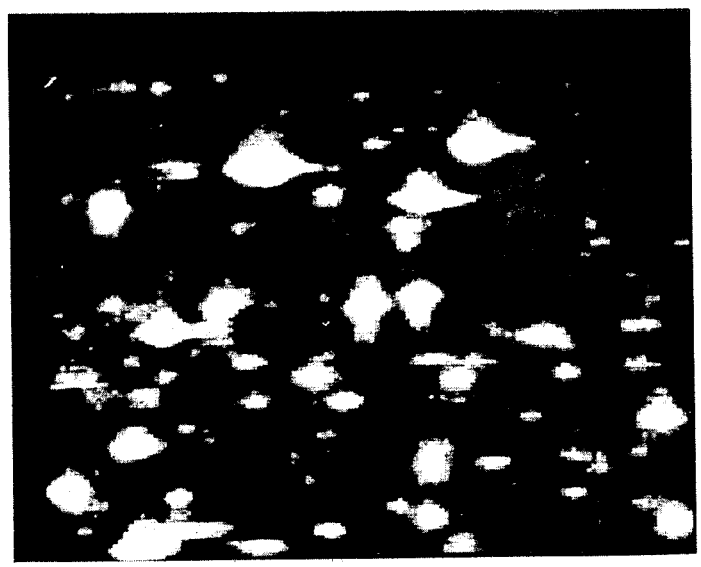
FIG. 7 is a virtual image showing the difference of the virtual images of FIGS. 5 and 6.

Finally, FIG. 7 is a virtual image produced by subtracting the FIG. 6 virtual image from the FIG. 5 virtual image. Consequently, both the nonhomogeneous background and the streaking of the real image of FIG. 3 are removed. The virtual image of FIG. 7 is therefore relatively "clean" and includes only blood protein deposits and can be more critically analyzed than the real image of FIG. 3. Sample analysis is completed by locating the local maxima of the FIG. 7 image and determining the height or intensity of the local maxima using CLU 32. As will be readily appreciated by this rather brief review of grayscale mathematical morphology, grayscale manipulation provides a relatively wide range of image analysis.

Conceptual Breakdown of Grayscale Image Processing

Figure 8:
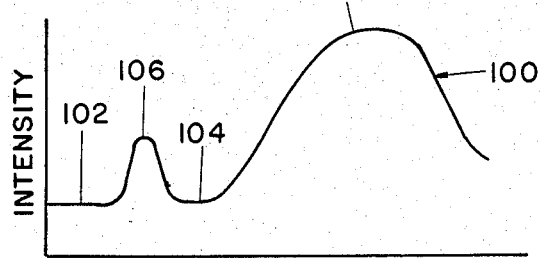
FIG. 8 is a diagram of the light intensity along one horizontal scan line of a grayscale image.
Figure 9:
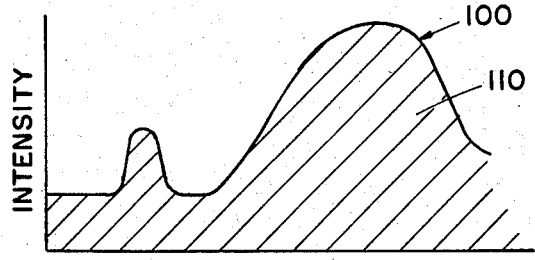
FIG. 9 is a diagram showing the umbra of the intensity function of FIG. 8.

Grayscale image transformations can be conceptually broken down into binary transformations by considering the umbra representation of a grayscale image. FIG. 8 illustrates intensity function 100 of a grayscale image along a single scan line. Distance along the horizontal axes corresponds to distance along the horizontal scan line; while distance along the vertical axes corresponds to the intensity or brightness of the grayscale image at the corresponding position on the scan line. For example, intensity function 100 includes two relatively dark portions 102 and 104, a relatively narrow bright spot 106, and a relatively wide brighter area 108. Umbra 110 of intensity function 100 is illustrated in FIG. 9. The umbra of an intensity function is the locus of points between the intensity function and minus infinity, inclusive of the intensity function. Consequently, umbra 110 of intensity function 100 is the crosshatched area under and including intensity function 100 in FIG. 9.

Figure 10:
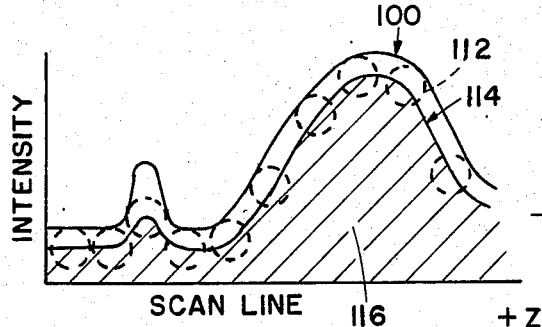
FIG. 10 is a diagram showing the erosion of the umbra of FIG. 9 by a circular structuring element.
Figure 11:
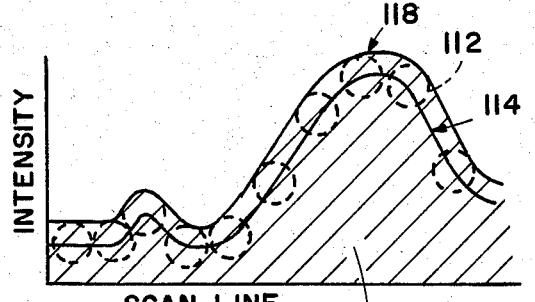
FIG. 11 is a diagram showing the dilation of the eroded umbra of FIG. 10 by the same circular structuring element.

Umbra 110 of intensity function 100 can be eroded by circular structuring element 112 to produce an eroded intensity function 114 having umbra 116 (FIG. 10). Similarly, eroded intensity function 114 can be dilated by the same circular structuring element 112 (FIG. 11) to produce intensity function 118 and its associated umbra 120. Intensity function 118 is the opening of intensity function 100, meaning that intensity function 100 has been eroded and dilated by the identical structuring element, namely disc 112.

Figure 12:
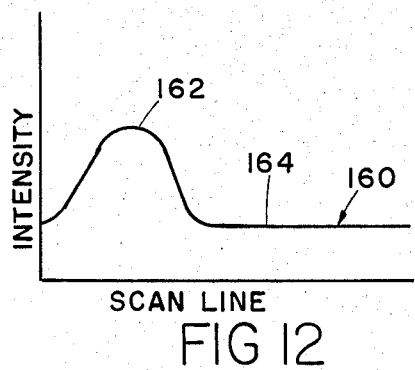
FIG. 12 is a diagram of the intensity function of another horizontal scan line of a grayscale image.
Figure 13:
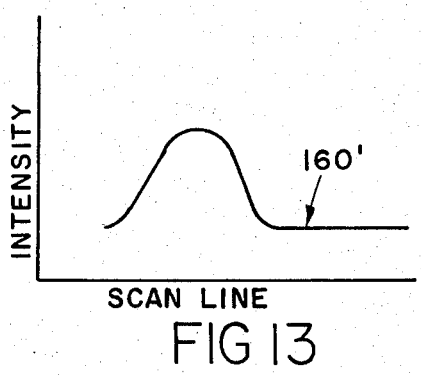
FIG. 13 is a diagram showing the intensity function of FIG. 12 shifted only along the scan line.
Figure 14:
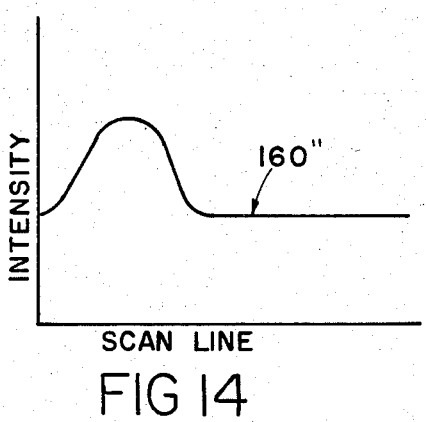
FIG. 14 is a diagram showing the intensity function of FIG. 12 shifted only in intensity.
Figure 15:
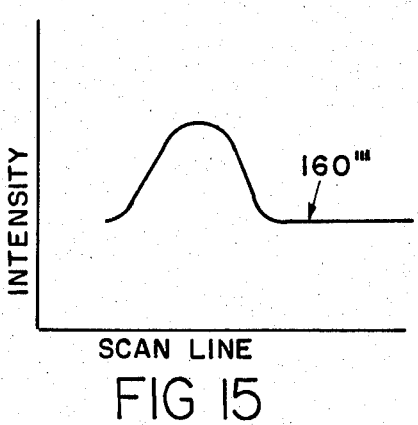
FIG. 15 is a diagram showing the intensity function of FIG. 12 shifted both along the scan line and in intensity.

FIGS. 12–15 illustrate the concept of shifting a grayscale image. Intensity function 160 is illustrated in FIG. 12 and includes a relatively bright area 162 and a relatively wide uniformly dark area 164. Intensity function 160 can be shifted along the scan line in a horizontal direction (FIG. 13) to produce a shifted intensity function 160' by delaying the serial signal stream by an appropriate number of pixel counts. Functions 160 and 160' have identical shapes. Intensity function 160 can be shifted in intensity to produce a new function 160" (FIG. 14) at the same scan line position by adding a constant value to function 160 at all points on the horizontal axis. The shape of function 160" is identical to the shape of function 160 although having a higher value at each corresponding point along the scan line. Finally, intensity function 160 can be shifted both along a scan line and in intensity by both delaying the signal stream and adding a constant value to each word in the signal stream to produce shifted intensity function 160''' (FIG. 15). Although not illustrated, intensity function 160 can be shifted vertically in the image one or more scan lines by delaying the signal stream a number of pixel counts corresponding to the length of the scan line.

Figure 16:
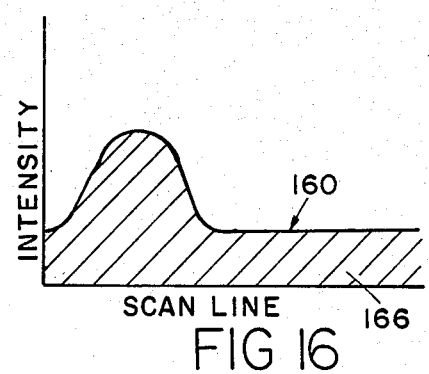
FIG. 16 is a diagram showing the umbra of the intensity function of FIG. 12.
Figure 17:
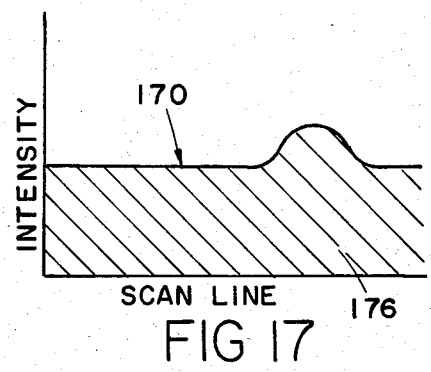
FIG. 17 is a diagram showing the intensity function and corresponding umbra of yet another scan line of a grayscale image.

FIGS. 16–19 illustrate the concept of the union of two grayscale images. Intensity function 160 and its associated umbra 166 are illustrated in FIG. 16; while intensity function 170 and its associated umbra 176 are illustrated in FIG. 17. As has been previously defined in mathematical morphology, the union (U) of two intensity functions A(x) and B(x) is expressed as follows:

$$A(x) U B(x) = \max[A(x), B(x)]$$

Figure 18:
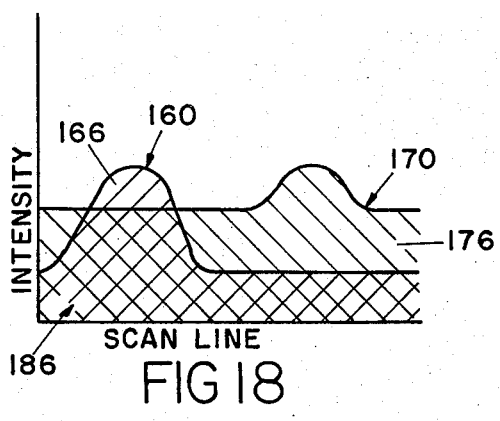
FIG. 18 is a diagram showing the umbrae of FIGS. 16 and 17 superimposed on one another.
Figure 19:
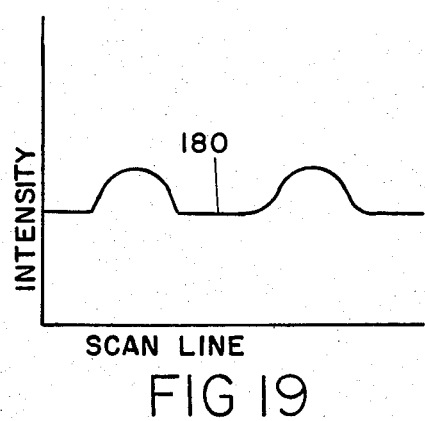
FIG. 19 is a diagram showing the intensity function of the union of the umbrae of FIGS. 16 and 17.

The union of intensity functions 160 and 170 is obtained through the steps disclosed in FIGS. 18 and 19. In FIG. 18, intensity functions 160 and 170 and their associated umbrae 166 and 176, respectively, are superimposed to produce a union umbra 186 consisting of all points in FIG. 18 which are crosshatched in either direction. Union intensity function 180 of umbra 186 is illustrated in FIG. 19 and corresponds to the defined union of intensity functions 160 and 170.

Figure 20:
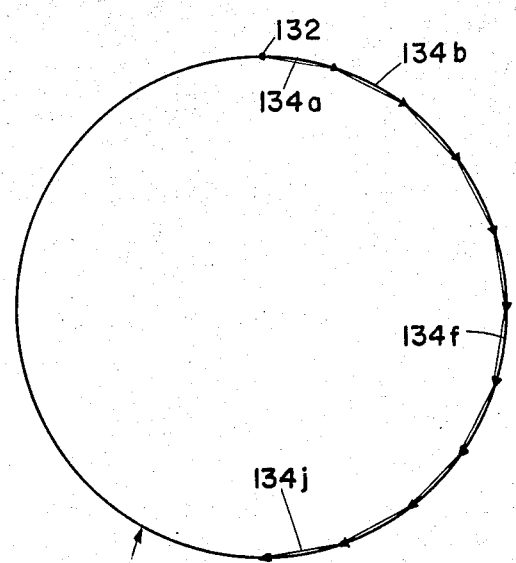
FIG. 20 is a diagram of a euclidean circular structuring element.

Euclidean circular, or disc-shaped, structuring element 130 (FIG. 20) is a two-dimensional structuring element which can be digitally constructed through a series of image transformations of a single point 132 by repetitively shifting the point along vectors 134 and ORing the shifted and unshifted images (see the Sternberg binary processor). Structuring element 130 is an idealized digital version wherein each of vectors 134 is identical in length.

Figure 21:
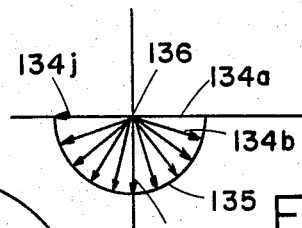
FIG. 21 is a diagram showing exemplary shift vectors oriented at the origin for producing the structuring element of FIG. 20.

FIG. 21 illustrates the reorientation of vectors 134 such that each of their tails is located at origin 136. The direction of vectors 134 has been maintained in rearranging the vectors from FIG. 20 to FIG. 21. The terminal points of vectors 134 lie along semicircle 135 extending below the horizontal axis such that the vectors form a hemidisc.

Figure 22:
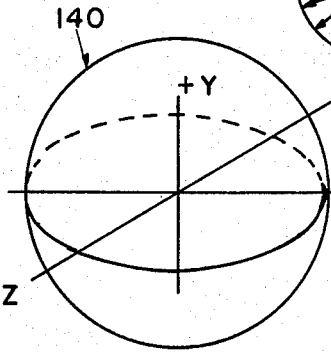
FIG. 22 is an isometric view of a euclidean spherical structuring element.
Figure 23:
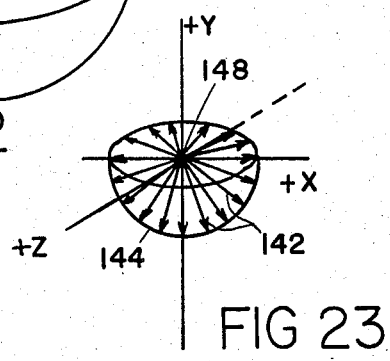
FIG 23 is a diagram showing exemplary shift vectors oriented at the origin for producing the structuring element of FIG. 22.

A three-dimensional euclidean spherical structuring element as might be used in grayscale image transformations is illustrated in FIG. 22. FIG. 23 is an extension of FIG. 21 and illustrates a set of idealized digital vectors 142 all having their tails oriented on the origin 148. The terminal ends of all vectors 142 lie on a hemisphere 144 uniformly filled with the vectors. Spherical structuring element 140 is created by repetitively shifting a point along vectors 142 and ORing the shifted and unshifted images.

Summarizing, FIGS. 8–11 illustrate that grayscale image transformations can be broken down into a series of binary, or nongrayscale, transformations. FIGS. 12–15 illustrate that grayscale images can be shifted horizontally and vertically in the image and can be shifted in intensity by appropriate time delays and adders. FIGS. 16–19 illustrate the union of two grayscale images. FIGS. 20–23 illustrate that a polar symmetric structuring element in two or three dimensions can be broken down into a plurality of suitable vector shifts and unions.

Specific Dilation Example

FIGS. 25–36 are charts showing the grayscale values of the pixels in a grayscale image which is 9 pixels high by 9 pixels wide. Each location in each column and row corresponds to one pixel in the grayscale image. The numbers correspond to the grayscale intensities for the pixels. Although illustrated on a nine-by-nine image window, the image size is approximately one-quarter million pixels (i.e., 480 lines by 512 pixels).

Grayscale structuring element 200 (FIG. 25) includes nine central pixels 202 each having a grayscale value of five; sixteen surrounding pixels 204 configured to form the outline of a square and each having a grayscale value of four; and twelve edge pixels 206 each having a grayscale value three and arranged in four groups of three pixels centered on the sides of square 204.

Figure 24:
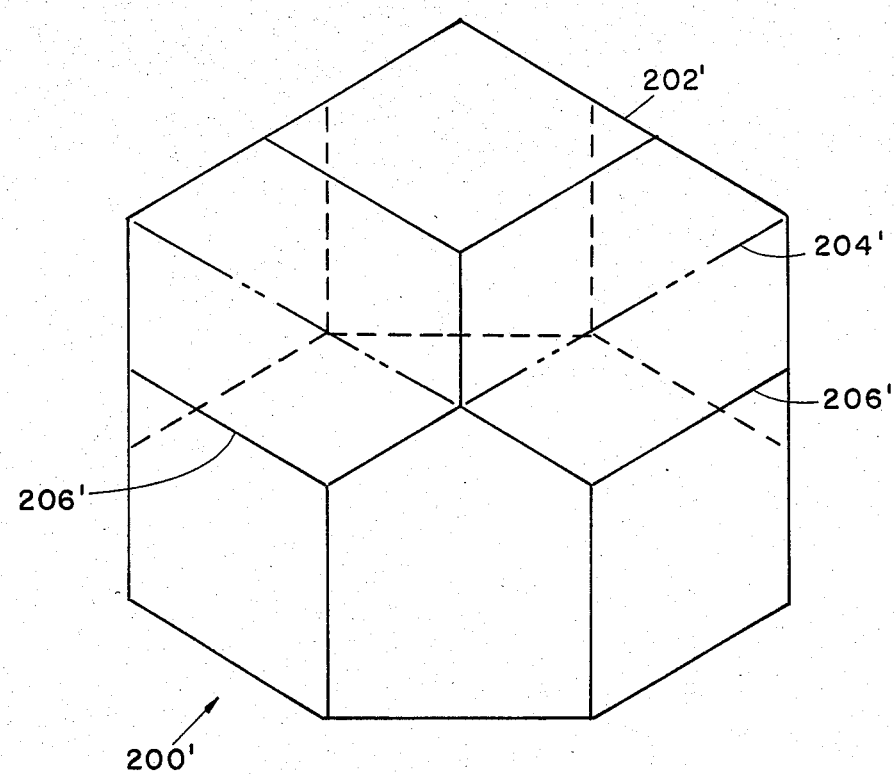
FIG. 24 is an isometric view of a grayscale structuring element.
Figure 25:
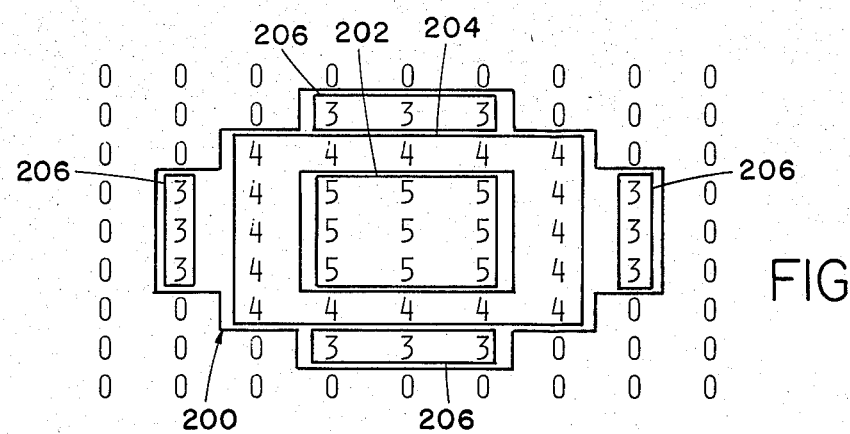
FIG. 25 is a chart showing the grayscale intensities of the pixels of the structuring element of FIG. 24.

FIG. 24 illustrates a three-dimensional structuring element 200' which corresponds to the digital grayscale structuring element 200 of FIG. 25. Structuring element 200' (FIG. 24) includes top portion 202' at a height of five units above the base of the structuring element, points along line 204' at a height of four units above the base, and points along line 206' at a height of three units above the base. Other three-dimensional structuring elements which might be used include spheres, cones, bars, cylinders, parabaloids, and polyhedrons.

Figure 26:
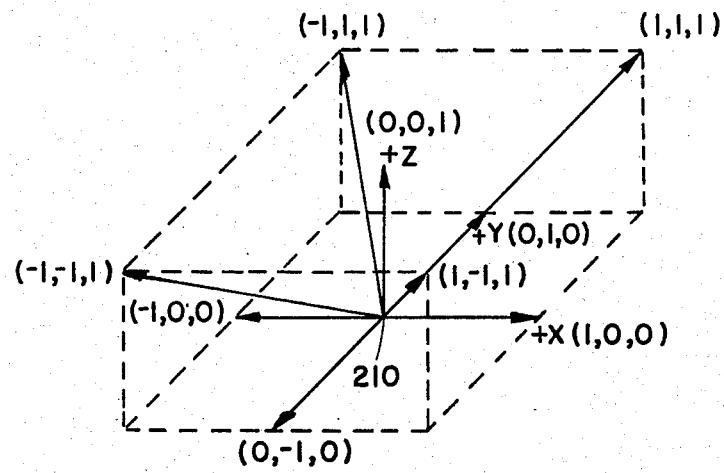
FIG. 26 is an oblique view showing the shift vectors (reoriented at the origin) required to produce the structuring element of FIG. 24.

FIG. 26 illustrates the vector shifts required to construct structuring element 200. The solid three-dimensional structuring element 200' (FIG. 24) is the dilation of a point along all of the FIG. 26 vectors when each vector is considered to be the set of points lying on the line segment forming the body of the vector. The digital grayscale structuring element 200 (FIG. 25) is the dilation of a point along all of the FIG. 26 vectors when each vector is considered to be only the two extreme points of the line segment. All vectors in FIG. 26 have their tails oriented at origin 210. The nine shift vectors have the following three-dimensional coordinates from the origin: (0,−1, 0), (1,−1,1), (1,0,0), (1,1,1), (0,1,0), (−1,1,1), (−1,0,0), (−1,−1,1), and (0,0,1). The first two coordinates of each vector specify shifts in the X and Y planes, while the third coordinate specifies a shift in grayscale value.

Figure 27:
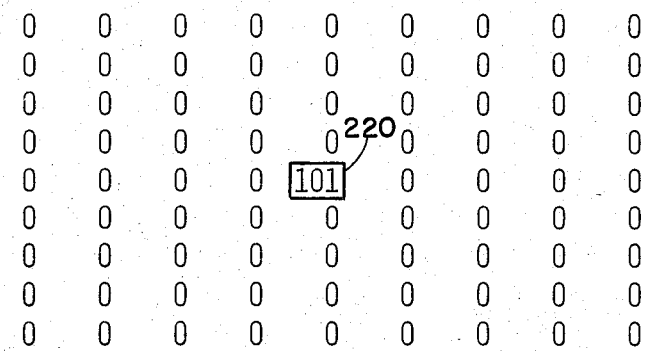
FIG. 27 is a chart showing a single illuminated pixel to be dilated by the FIG. 24 structuring element.
Figure 28:
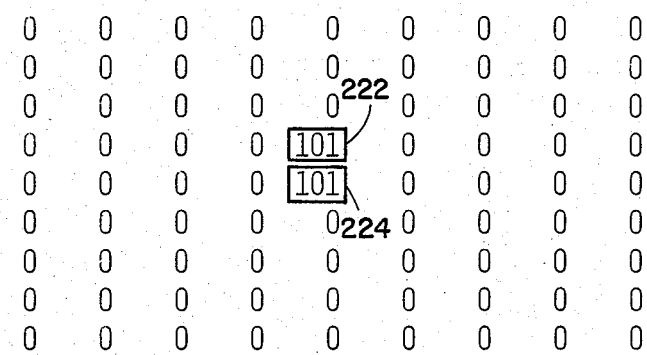
FIGS. 28–36 are charts showing virtual images corresponding to the FIG. 25 image at the various stages in the geometric logic unit.

FIG. 27 illustrates a single pixel 220 having a grayscale value of 101 to be dilated by the structuring element 200 of FIG. 25. The virtual images depicted in FIGS. 28-36 correspond to the image transformations corresponding to each of the vector shifts depicted in FIG. 26. The vector shifts are performed in the following order:

| FIG. | Shift Vector |
| --- | --- |
| 28 | (0,−1,0) |
| 29 | (1,−1,1) |
| 30 | (1, 0,0) |
| 31 | (1, 1,1) |
| 32 | (0, 1,0) |
| 33 | (−1, 1,1) |
| 34 | (−1, 0,0) |
| 35 | (−1,−1,1) |
| 36 | (0, 0,1). |

The first vector shift is (0,−1,0). The first two coordinates specify a shift of one scan line upwardly, while the third coordinate specifies no shift in intensity. Consequently, original pixel 220 is delayed exactly one scan line to produce pixel 222 (FIG. 28) having a grayscale value of 101 which is identical to the grayscale value of original pixel 220. The FIG. 27 image is unioned with the shifted image such that pixel 224 corresponding to old pixel 220 acquires a grayscale value of 101 to complete the FIG. 28 image.

The second vector shift is (1,−1,1). The first two coordinates of the vector shift indicate that the image is to be shifted one pixel to the right and one scan line upwardly, while the third coordinate specifies that the grayscale values of all shifted pixels are to be increased by 1. The grayscale values of pixels 222 and 224 (FIG. 28) are shifted to new pixels 226 in FIG. 29 which have a grayscale value of 102. The background pixels which previously had a value of zero are increased to value one. The union of the image of FIG. 28 with the new image changes the value of pixels 228 to 101 corresponding to pixels 222 and 224 in FIG. 28.

Figure 29:
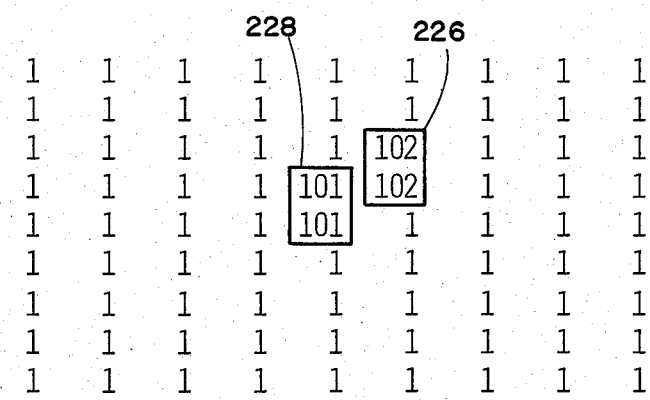

The third shift vector is (1,0,0). The first two coordinates designate a one-pixel shift to the right, while the third coordinate specifies no change in intensity. Pixels 226 and 228 of FIG. 29 are therefore shifted to pixels 230 of FIG. 30. The virtual image of FIG. 29 is then unioned with the delayed image such that pixels 232 are introduced into the virtual image and pixel 234 acquires the grayscale value 102. Prior to the union of the delayed image with the virtual image of FIG. 29, pixels 232 have a grayscale value of 1 and pixel 234 has a value of 101 (not shown).

Figure 30:
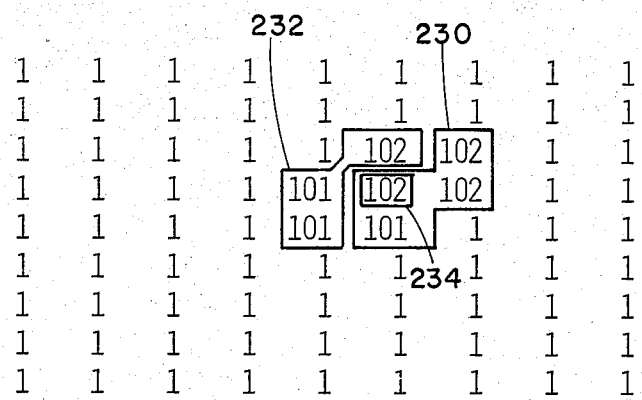
Figure 31:
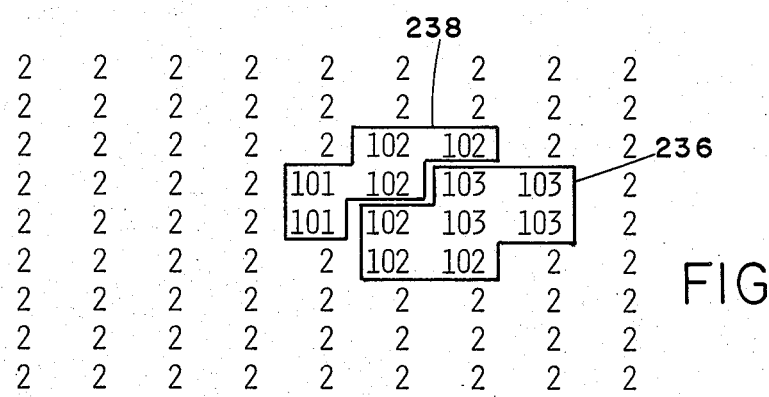

Stage 4 processing is illustrated in FIG. 31 and corresponds to the shift vector (1,1,1). The first two coordinates specify a shift of one pixel to the right and one pixel down, while the third coordinate specifies that each pixel value in the shifted stream is to be increased by one. Consequently, pixels 230 and 232 of FIG. 30 are shifted to pixels 236 and each is increased in grayscale value by one. The intensity of the background pixels also increases by one to have a resultant value 2. The virtual image of FIG. 30 is then unioned with the shifted pixels to modify the grayscale values of pixels 238.

Figure 32:
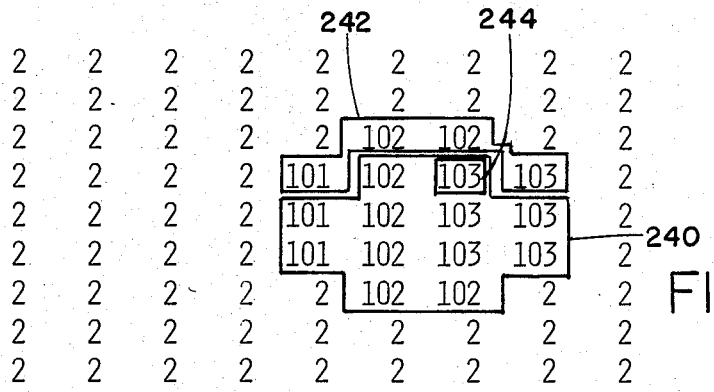

Processing for Stage 5 is illustrated in FIG. 32 and corresponds to the vector (0,1,0). The first two coordinates call for a shift of one scan line down, while the third coordinate calls for no alteration of gray value intensity in the shifted pixels. Consequently, pixels 236 and 238 of FIG. 31 are shifted to pixels 240 in FIG. 32. The background pixels maintain their grayscale value of two. The virtual image of FIG. 31 is unioned with the shifted image to alter the grayscale value of pixel locations 242. Additionally, through the union, the grayscale value of pixel 244 changes to 103.

Figure 33:
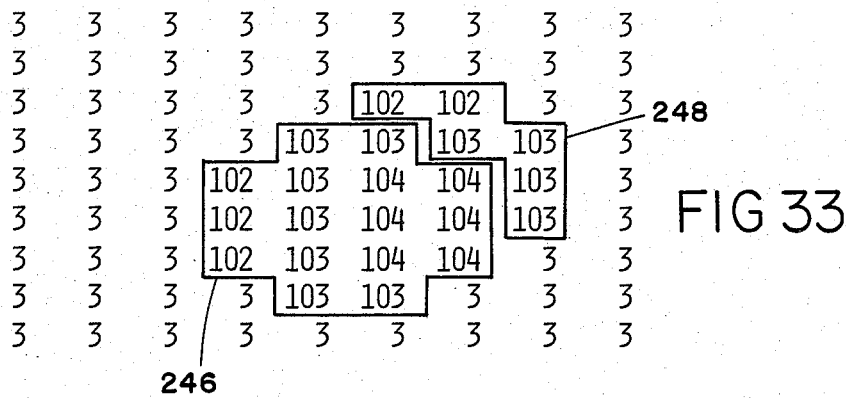

Stage 6 processing is depicted in FIG. 33 and corresponds to shift vector (−1,1,1). The first two coordinates call for a shift left of one pixel and a shift down of one scan line, while the third coordinate indicates that the grayscale value of the shifted pixels is to be increased by one. Consequently, pixels 240 and 242 of FIG. 32 are shifted to pixels 246 of FIG. 33. Additionally, the grayscale values of pixels 246 and the background pixels are each increased by one. The virtual image of FIG. 32 is unioned with the shifted image so that pixels 248 acquire modified grayscale values.

Figure 34:
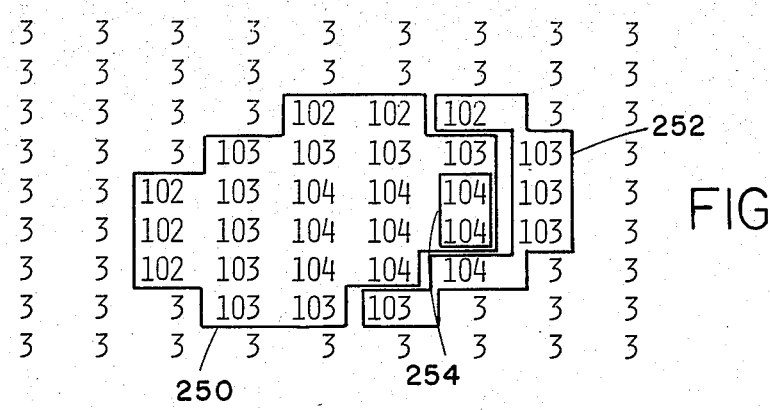

FIG. 34 illustrates the processing performed in the Stage 7 vector shift of (−1,0,0). The first two coordinates specify a shift of one pixel to the left, while the third coordinate indicates that the grayscale value of the shifted image is not to be changed. Therefore, pixels 246 and 248 of FIG. 33 are shifted to pixels 250 in FIG. 34. The background pixels maintain their grayscale value of three. The virtual image of FIG. 33 is unioned with the shifted image such that pixels 252 acquire modified grayscale values. Additionally, the grayscale values of pixels 254 within pixel group 250 are increased to 104 corresponding to the pixel values in FIG. 33.

Figure 35:
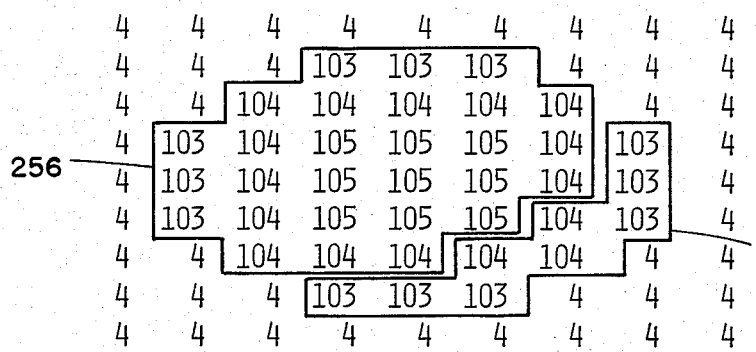

The Stage 8 processing is illustrated in FIG. 35 and corresponds to shift vector (−1,−1,1). The first two coordinates of the vector indicate that a shift of one pixel left and one scan line up is required, while the third coordinate indicates that all shifted grayscale pixel values are to be increased by one. Consequently, pixels 250 and 252 are shifted to pixels 256, each of which is increased in grayscale value by one. The background pixels also increase in grayscale by one to have value four. The virtual image of FIG. 34 is unioned with the shifted image to alter the grayscale value of pixels 258 to the corresponding values in FIG. 34.

Figure 36:
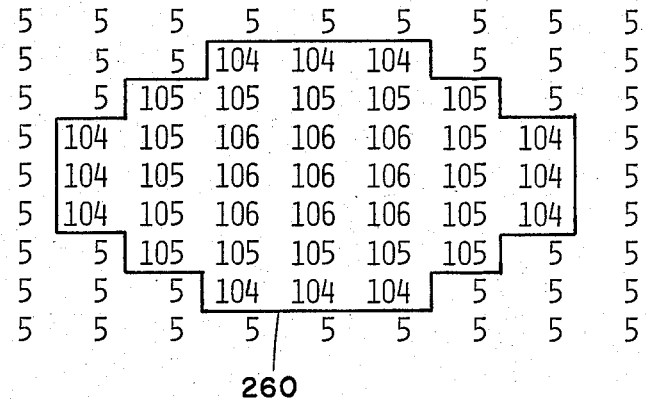

FIG. 36 illustrates the last or Stage 9 processing corresponding to the vector (0,0,1). The first two coordinates indicate that no shifting is to be performed, while the third coordinate indicates that all grayscale values are to be increased by one. Consequently, pixels 256 and 258 of FIG. 35 remain in the same position i.e., pixels 260 in FIG. 36; however, the grayscale value of pixels 260 as well as the background pixels is increased by one. The background pixels therefore have a grayscale value of five, while each of the pixels 260 has a value one higher than the corresponding pixel in FIG. 35. The virtual image of FIG. 36 is the dilation of the image of FIG. 27 containing a single nonzero pixel 220 by the structuring element illustrated in FIG. 25.

Geometric Logic Unit (GLU) Structure

Figure 2:
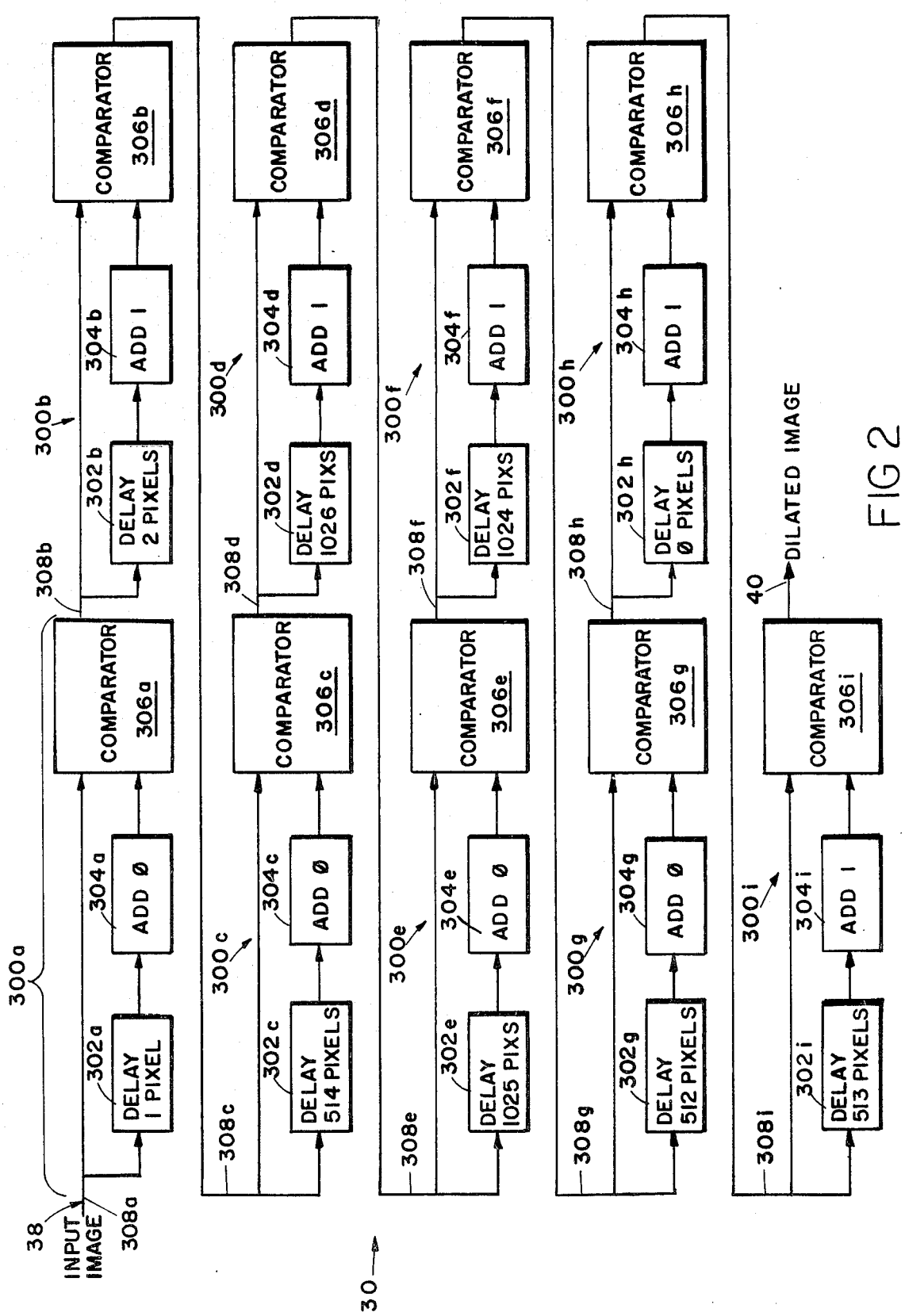
FIG. 2 is a detailed schematic diagram of the geometric logic unit (GLU) of the processor.

The structure for implementing the dilation depicted in FIGS. 27-36 is illustrated in FIG. 2. GLU 30 comprises a plurality of sequentially coupled function units 300 each of which includes delay device 302, adder 304, and comparator 306. Each function unit 300 includes input line 308 which delivers a serial signal both to the delay 302 and the comparator 306. The input signal stream delivered to delay 302 is delayed by the indicated number of pixels and then inputted to adder 304 which adds the indicated fixed or constant value to each word within the digital signal stream. This supplemented signal is then delivered to the comparator 306 which logically combines the delayed and undelayed signals to produce an output signal delivered to the input line 308 of the next sequential function unit. As illustrated, each delay 302 precedes the associated adder 304; however, the system works equally well if each adder 304 precedes the associated delay 302. Delays 302 and adders 304 are dynamically programmable under the control of computer 18 (see FIG. 1) to provide a desired delay and to add a desired fixed value to the pixel stream on each pass through the GLU. The values indicated within blocks 302 and 304 are those required to perform the dilation depicted in FIGS. 27-36. All lines depicted in FIG. 2 are eight-bit buses enabling the eight-bit serial words in the digitized stream to be passed in serial form.

The delays and the fixed values to be added to the words of the delayed pixel streams are illustrated in the following table:

| Function Unit | Shift Vector | Desired Delay In Pixels | Modified Delay | Adder Value |
|---|---|---|---|---|
| a | (0,−1,0) | −512 | 1 | 0 |
| b | (1,−1,1) | −511 | 2 | 1 |
| c | (1, 0,0) | 1 | 514 | 0 |
| d | (1, 1,1) | 513 | 1026 | 1 |
| e | (0, 1,0) | 512 | 1025 | 0 |
| f | (−1, 1,1) | 511 | 1024 | 1 |
| g | (−1, 0,0) | −1 | 512 | 0 |
| h | (−1,−1,1) | −513 | 0 | 1 |
| i | (0, 0,1) | 0 | 513 | 1 |

Many of the "desired delays" are negative. Consequently, a positive number corresponding to the negative number with largest magnitude in the "Desired Delay" column is added to all of the "desired delay" values to produce the "modified delay" values. In the example, this value is 513 because the negative number of largest magnitude is −513 (Stage h). Consequently, −512 becomes 1; −511 becomes 2; 1 becomes 514; and so forth. The "adder values" correspond to the third coordinate of the "shift vectors" and indicate the amount by which the grayscale value for each pixel in the delayed stream is to be increased. Each of the values under the column "Modified Delay" for each stage is applied to the appropriate delay 302 such that the delay for that function unit provides the desired shift. Similarly, adders 304 are programmed under the control of computer 18 to add the value under the column "Adder Value" for the appropriate stage.

The input image to be dilated is delivered to GLU 30 on bus 38 (FIG. 2) and is conveyed over line 308a to both delay 302a and comparator 306a. In the present example, this image corresponds to the real image depicted in FIG. 27. This image is delayed one pixel by delay 302a and the value 0 is added to each word in the delayed pixel stream at adder 304a. The undelayed and delayed signals are then delivered to comparator 306a which performs a logical function, or combination, of the serialized streams on a word-by-word basis. In the preferred embodiment, comparator 306a selects the maximum of the undelayed and delayed stream in accordance with the above definition of union, which maximum is outputted on line 308b to second function unit 300b. The serial signal traveling over line 308b corresponds to the image of FIG. 28. The FIG. 28 image is delayed two pixels by delay 302b and each grayscale value of each word in the delayed stream is increased by 1 as it passes through adder 304b. The undelayed and delayed signals are then applied to comparator 306b which selects the maximum value for each pixel and outputs said value on line 308c. The image passing over line 308c corresponds to the virtual image of FIG. 29.

Function units 300c, d, e, f, g, h, and i perform in a manner analogous to that described for function units 300a and b. Each delay 302 provides the appropriate delay as set forth in the above chart under the column "Modified Delay"; and each adder 304 supplements each word of the delayed digitized stream by the value indicated under the column "Adder Value" in the above chart. Consequently, the images passing over lines 308d, e, f, g, h, and i and bus 40 are the virtual images depicted in FIGS. 30-36, respectively. The dilated image of FIG. 36 is outputted on bus 40 and delivered to CLU 32 (see FIG. 1). Because of the offset of 513 pixels used to alter all of the "desired delay" values to "modified delay" values, appropriate panning and scrolling must be performed in software as the image is stored in frame buffer 26 to return the image to the proper screen position. In the case of the value 513, this means shifting the image up one scan line and left one pixel prior to storage.

The number of function units 300 in GLU 30 depends in part upon the dilations performed. Although nine function units are illustrated in FIG. 2, virtually any number can be used. Typically, a relatively large number (e.g., 27) will be provided, and the delays 302 and adders 304 of unused units on any particular pass will be set to 0.

By taking advantage of one of the long-known theorems of mathematical morphology, the present grayscale image processor 10 does not require separate specialized circuitry for eroding an image. The theorem utilized is that the erosion of a grayscale image by a structuring element is the dilation of the background, or complement, of the image by the structuring element reflected about the origin. Stated another way, the dilation of the background or complement of an image is equivalent to the erosion of an image when the structuring element is symmetric about the origin (polar symmetric). When polar symmetric structuring elements (such as a sphere) are used, the theorem may be stated as the erosion of the image is the dilation of the background or complement of the image. Therefore, when an image is to be eroded, the image is first complemented in ALU 28, dilated in GLU 30, and then again complemented in ALU 28 on a second pass through processor 12. Complement means taking the two's complememt of each eight-bit word in the serial signal stream. Accordingly, the present processor is capable of eroding the image as well as dilating the image.

The above description is that of a preferred embodiment of the invention. Various changes and alterations can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. An image processing system for processing at least one start grayscale image each made up of a matrix of points, said system comprising:
   serializing means for producing at least one first serial signal including a plurality of multi-bit words each corresponding to one of the points of the associated start image;
   delay means for delaying selected ones of the first signals to produce at least one delayed serial signal each corresponding to one of the first signals, said delay means including adder means for adding a desired value to each word delayed by said delay means; and
   operating means for performing operations on selected ones of the delayed signals and the first signals to produce at least one output serial signal.

2. A system as defined in claim 1 wherein said operating means comprises means for performing logical operations on one of the delayed signals and one of the first signals.

3. A system as defined in claim 2 wherein said logical operating means comprises means for selecting the maximum of the one delay signal and the one first signal.

4. A geometric logic unit for processing at least one start serial signal each representative of a grayscale image made up of a matrix of points to produce at least one processed serial signal each representative of a processed grayscale image, each serial signal including a plurality of multi-bit words each corresponding to one of the points and having a value representative of the intensity of the one point, said geometric logic unit comprising a plurality of serially coupled stages each in turn comprising:
   input port means for receiving at least one input serial signal;
   delay means for delaying selected ones of the input signals to produce at least one delayed serial signal each corresponding to one of the input signals;
   adder means for adding a preselected value to each word of each delayed serial signal to produce at least one modified delayed serial signal each corresponding to one of the delayed serial signals;
   means for combining selected ones of the modified delayed serial signals and the input signals to produce at least one output serial signal; and
   output port means for outputting the output signals.

5. A geometric logic unit as defined in claim 4 wherein said combining means comprises means for logically combining the selected ones of the delayed signals and the input signals.

6. A geometric logic unit as defined in claim 5 wherein said logical combining means comprises means for selecting the maximum of the selected ones of the delayed signals.

7. A geometric logic unit for processing a serial signal including words representative of a grayscale image made up of a matrix of points to produce a serial signal representation of a dilation of the image, said geometric logic unit comprising a plurality of serially coupled stages each including:
   delay means for delaying an input signal inputted thereto to produce a delayed signal;
   adder means for increasing the value of each word in the delayed signal by a fixed amount to produce a supplemented delayed signal; and
   means for logically combining the input signal and the supplemented delayed signal to produce an output signal.

8. A geometric logic unit as defined in claim 7 wherein said combining means comprises means for selecting the maximum of the inputted and supplemented delayed signals on a word-by-word basis.

9. A geometric logic unit as defined in claim 7 wherein said delaying means comprises a programmable delay circuit for selectively delaying an input signal applied thereto.

10. A geometric logic unit as defined in claim 9 wherein said adder means comprises a programmable adder for adding a selected value to the words in the delayed signal.

11. A geometric logic unit as defined in claim 7 wherein said adder means comprises a programmable adder for adding a selected value to the words in the delayed signal.

12. A system for processing a start grayscale image made up of a matrix of points, said system comprising:
   serializing means for producing a first serial signal representative of the start grayscale image, said first serial signal including a multi-bit word corresponding to each point in the start image;
   delay means for delaying the first serial signal producing a delay serial signal;
   adder means for adding a constant value to each word in the delay serial signal to produce an altered delay serial signal; and
   means for combining the first serial signal and the altered delay serial signal producing a serial signal representative of a transformation of the start image.

13. A system as defined in claim 12 wherein said combining means comprises means for logically combining the first serial signal and the altered delay serial signal.

14. A system as defined in claim 13 wherein said logical combining means comprises means for selecting the maximum of the first serial signal and the altered delay signal.

15. A system as defined in claim 12 wherein said system comprises a plurality of stages each including one of said delay means, one of said adder means, and one of said combining means; and further comprising control means for routing the serial signal sequentially through said plurality of stages.

16. A method of manipulating at least one start serial signal each representative of a grayscale image including a matrix of pixels to produce at least one resultant serial signal each representative of a processed image, each signal including a plurality of multi-bit words, each word corresponding to a pixel and having a value indicative of the light intensity of the pixel, said method comprising routing said start signals sequentially through a plurality of processing sequences each comprising:

supplying at least one input signal each to an input port;

delaying at least one of the input signals to produce at least one delayed signal each corresponding to one of the input signals;

adding a fixed value to each word of at least one delayed signal to produce at least one modified delayed signal each corresponding to one of the delayed signals; and combining selected ones of the modified delayed signals and the input signals to produce at least one output serial signal.

17. A method as defined in claim 16 wherein said combining step comprises performing logical operations on one of the modified delayed signals and one of the input signals.

18. A method as defined in claim 17 wherein said performing step comprises selecting the maximum of the one modified delay signal and the one input signal to produce a first output signal.

19. A method of processing at least one grayscale image each made up of a matrix of points, said method comprising:

serializing each matrix of points into an input serial signal including one multi-bit word corresponding to each point;

shifting at least one of said input serial signals to produce a shifted serial signal;

adding a selected value to each word included in the shifted serial signal to produce a modified delayed serial signal; and operating on selected ones of the input serial signals and the modified delayed serial signals to produce at least one output signal representative of an output grayscale image.

20. A method as defined in claim 19 wherein said operating step comprises logically operating on one of the modified delayed serial signals and one of the input serial signals to produce the output signal.

21. A method as defined in claim 20 wherein said logically operating step comprises selecting the greater of the one modified delayed serial signal and the one input serial signal.

22. A method of manipulating a serial signal including serial words representative of a grayscale image to produce a serial signal representative of a transformation of the image, said method comprising routing said serial signal sequentially through a plurality of processing sequences each including the steps of:

delaying an input signal to produce a delayed signal;

adding a constant value to each word in the delayed signal to produce a supplemented delayed signal; and logically combining the input signal and the supplemented delayed signal to produce an output signal.

23. A method as defined in claim 22 wherein each of said combining steps comprises selecting the maximum of the input and supplemented delayed signals on a word-by-word basis.

24. A method of transforming a grayscale image made of a matrix of points, said method comprising:

serializing said matrix of points into a first serial signal including a multi-bit word corresponding to each point, each of the words having a value indicative of the light intensity of the corresponding point;

shifting the first serial signal to produce a shifted serial signal;

adding a fixed value to each word of the shifted serial signal to produce a modified shifted serial signal; and combining the first serial signal and the modified shifted serial signal to produce a serial signal representative of transformation of the image.

25. A method as defined in claim 24 wherein said method comprises a plurality of step groups each comprising one of said shifting steps, one of said adding steps, and one of said combining steps; and wherein said method further comprises routing said first serialized signal sequentially through said plurality of step groups.

26. A method as defined in claim 25 wherein each of said shifting steps comprises delaying the serial signal inputted to the associated step group.

27. A method as defined in claim 26 wherein each of said combining steps comprises logically combining the signals inputted to and delayed by the associated step group on a word-by-word basis.

28. A method as defined in claim 27 wherein said logically combining step comprises selecting the maximum of the signals inputted to and delayed by the associated step group on a word-by-word basis.

29. A method as defined in claim 25 wherein each of said combining steps comprises logically combining the signals inputted to and shifted by the associated step group on a word-by-word basis.

30. A method as defined in claim 29 wherein said logically combining step comprises selecting the maximum of the signals inputted to and delayed by the associated step group on a word-by-word basis.

* * * * *